United States Patent
Nonoyama et al.

(10) Patent No.: US 11,322,756 B2
(45) Date of Patent: May 3, 2022

(54) COOLING SYSTEM OF FUEL CELL

(71) Applicant: TOYOTA JIDOSHA KABUSHIKI KAISHA, Toyota (JP)

(72) Inventors: Nobuaki Nonoyama, Chiryu (JP); Hiromichi Sato, Hadano (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 17/070,449

(22) Filed: Oct. 14, 2020

(65) Prior Publication Data

US 2021/0175522 A1 Jun. 10, 2021

(30) Foreign Application Priority Data

Dec. 6, 2019 (JP) .............................. JP2019-221176

(51) Int. Cl.
*H01M 8/04029* (2016.01)
*H01M 8/04089* (2016.01)
*H01M 8/04746* (2016.01)

(52) U.S. Cl.
CPC ... *H01M 8/04029* (2013.01); *H01M 8/04104* (2013.01); *H01M 8/04768* (2013.01)

(58) Field of Classification Search
CPC ......... H01M 8/04029; H01M 8/04104; H01M 8/04768
See application file for complete search history.

(56) References Cited

U.S. PATENT DOCUMENTS

| | | | |
|---|---|---|---|
| 2004/0265654 A1 | 12/2004 | Imaseki et al. | |
| 2005/0221146 A1* | 10/2005 | Horiguchi | H01M 8/04097 429/456 |
| 2017/0133696 A1* | 5/2017 | Komatsubara | H01M 8/04074 |

FOREIGN PATENT DOCUMENTS

| | | | | |
|---|---|---|---|---|
| EP | 1749325 A2 * | 2/2007 | ........ | H01M 8/04007 |
| JP | 2003-340230 A | 12/2003 | | |
| JP | 2004-335154 A | 11/2004 | | |
| JP | 2009-091165 A | 4/2009 | | |

(Continued)

OTHER PUBLICATIONS

Mitani, Tohru et al., "Minimum Ignition Energy of $H_2$—$O_2$ Mixtures Predictions by CHEMKIN Experiments and an Activation-Energy-Asymptotics", Journal of the Combustion Society of Japan, vol. 51, No. 158 (2009) pp. 325-333.

(Continued)

*Primary Examiner* — Olatunji A Godo
(74) *Attorney, Agent, or Firm* — Finnegan, Henderson, Farabow, Garrett & Dunner, LLP (57) ABSTRACT

In a cooling system of a fuel cell, a first container for receiving a part of a coolant from a circulation flow path for circulating a coolant between a fuel cell and a heat exchanger is connected to the circulation flow path, a second container is connected to the first container via a pressure regulating valve, and a gas diffusion portion is provided in the second container. When a pressure inside the first container is equal to or higher than a threshold, the pressure regulating valve is opened and a gas inside the first container is released into the second container. The gas diffusion portion gradually discharges the gas released into the second container to outside of the system.

4 Claims, 5 Drawing Sheets

(56) References Cited

FOREIGN PATENT DOCUMENTS

| | | |
|---|---|---|
| JP | 5315886 B2 | 10/2013 |
| JP | 2015-207420 A | 11/2015 |

OTHER PUBLICATIONS

Yoshikawa, Norihiko et al., "Basic Design and Fundamental Experiments of a Damage Reduction System Against Hydrogen Explosions", Journal of Japan Society for Safety Engineering, vol. 54, No. 2 (2015) pp. 122-130.

* cited by examiner

COOLING SYSTEM OF FUEL CELL

CROSS-REFERENCE TO RELATED APPLICATION

This application claims priority to Japanese Patent Application No. 2019-221176 filed on Dec. 6, 2019, incorporated herein by reference in its entirety.

BACKGROUND

1. Technical Field

The present application discloses a cooling system of a fuel cell.

2. Description of Related Art

In order to further popularize fuel cells, cost reduction of fuel cells is being promoted. For example, simplification of a seal structure for partitioning a gas flow path and a coolant flow path of a fuel cell and use of resin for a separator have been considered. In this case, gas is likely to leak from the gas flow path to the coolant flow path, which may lead to a reduction in cooling efficiency. Thus, a technique for removing the gas leaked from the gas flow path to the coolant flow path of the fuel cell to the outside of the system is required.

For example, in a technique disclosed in Japanese Unexamined Patent Application Publication No. 2004-335154 (JP 2004-335154 A), a coolant storage container and an air discharge system of a fuel cell are connected, and air from the air discharge system of the fuel cell is sent to a space in which gas in the coolant storage container stays so that inside of the coolant storage container is ventilated. In this way, the gas leaked from the gas flow path of the fuel cell to the coolant path can be removed from the system to the outside.

A technique disclosed Japanese Unexamined Patent Application Publication No. 2015-207420 (JP 2015-207420 A) is also known as a gas discharging technique in a fuel cell system. Although not related to the fuel cell system, the technologies disclosed in Japanese Unexamined Patent Application Publication No. 2003-340230 (JP 2003-340230 A) and Japanese Unexamined Patent Application Publication No. 2009-091165 (JP 2009-091165 A) are also known.

SUMMARY

In the technique disclosed in JP 2009-091165 A, it is possible to discharge gas in a coolant storage container to outside of a system while diluting it with air. However, in the technique disclosed in JP 2009-091165 A, it may not be possible to send air from an air discharge system into the coolant storage container depending on an operating state of a fuel cell. That is, there is a possibility that ventilation in the coolant storage container cannot be performed at an appropriate timing. Further, the system may be complicated. For example, an opening/closing control of the air discharge system may be required. Further, when the inside of the coolant storage container is ventilated, the coolant may be unnecessarily volatilized to the outside of the system.

One aspect of the present disclosure provides a cooling system of a fuel cell. The cooling system includes: a fuel cell; a heat exchanger; a circulation flow path configured to circulate a coolant between the fuel cell and the heat exchanger; a first container that is connected to the circulation flow path and that is configured to receive at least a part of the coolant from the circulation flow path; a pressure regulating valve that is provided in the first container and that is configured to release a gas inside the first container to outside the first container when a pressure inside the first container is equal to or higher than a threshold; a second container that is connected to the first container via the pressure regulating valve and that is configured to receive the gas released from inside the first container via the pressure regulating valve; and a gas diffusion portion provided in the second container. The gas diffusion portion is configured such that the gas released inside of the second container via the pressure regulating valve is discharged outside the cooling system via the gas diffusion portion when the pressure inside the first container is equal to or higher than the threshold.

In the cooling system of the present disclosure, the fuel cell may be configured to receive at least a supply of hydrogen and generate power, and the gas released from the first container may contain hydrogen.

In the cooling system of the present disclosure, the gas diffusion portion may have a plurality of through holes that extend from inside to outside of the second container.

In the cooling system of the present disclosure, a hole diameter of the through holes of the gas diffusion portion may be 0.62 mm or less.

In the system of the present disclosure, when the pressure of the gas becomes high in the cooling system of the fuel cell, the gas is discharged outside the system safely, simply, and at an appropriate timing while volatilization of the coolant is suppressed.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
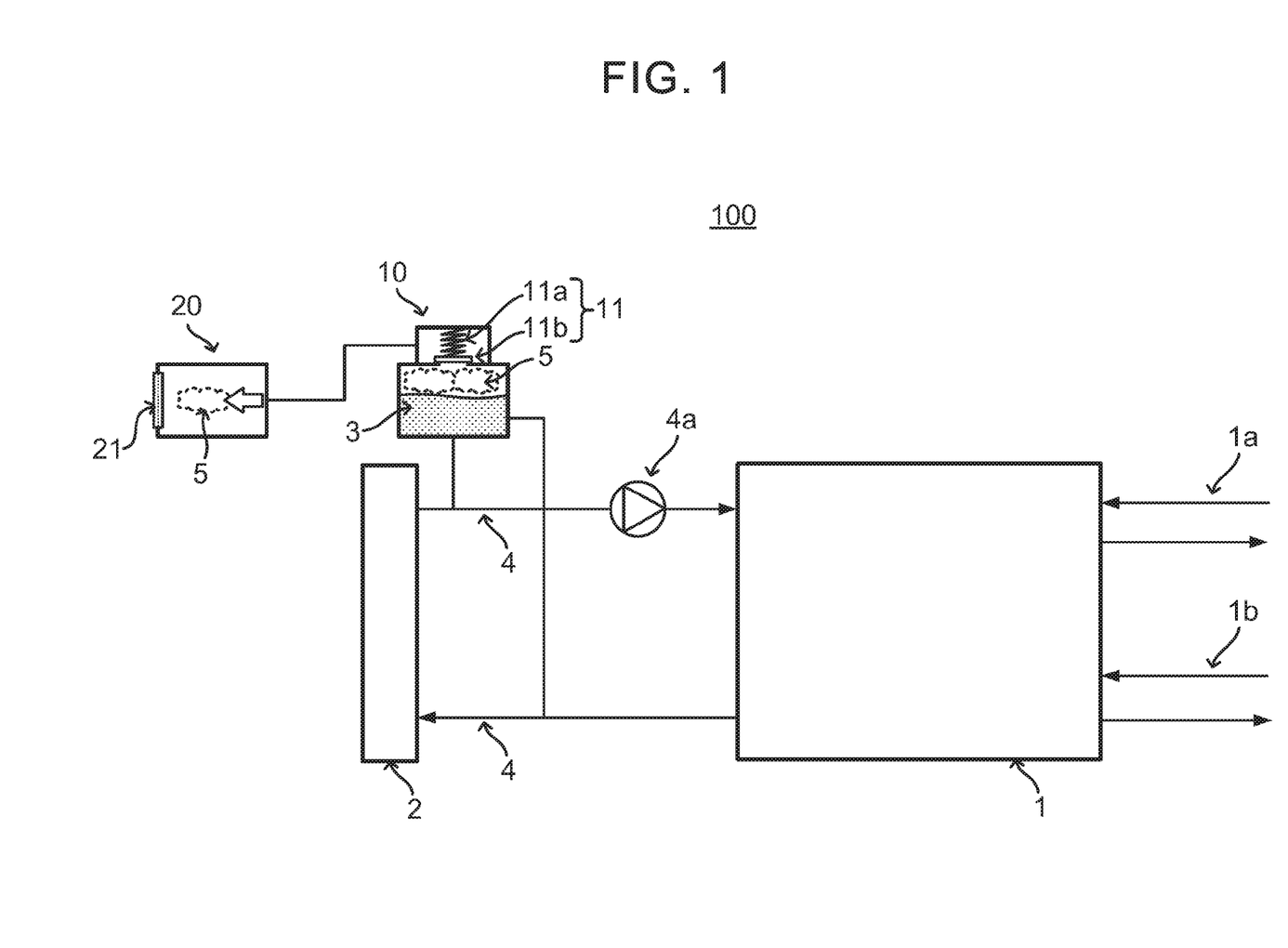
FIG. 1 is a schematic diagram for describing an example of a configuration of a cooling system of a fuel cell.

FIG. 1 shows an example of a configuration of a cooling system of a fuel cell. The system 100 shown in FIG. 1 includes: a fuel cell 1; a heat exchanger 2; a circulation flow path 4 for circulating a coolant 3 between the fuel cell 1 and the heat exchanger 2; a first container 10 that is connected to the circulation flow path 4 and that receives at least a part of the coolant 3 from the circulation flow path 4; a pressure regulating valve 11 that is provided in the first container 10 and that releases a gas 5 inside the first container 10 to outside the first container 10 when a pressure inside the first container 10 is equal to or higher than a threshold; a second container 20 that is connected to the first container 10 via the pressure regulating valve 11 and that receives the gas 5 released from inside the first container 10 via the pressure regulating valve 11; and a gas diffusion portion 21 provided in the second container 20. In a system 100, when the pressure inside the first container 10 becomes equal to or higher than a threshold, the gas 5 inside the first container 10 is released to the inside of the second container 20 via the pressure regulating valve 11, and the gas 5 released to the inside of the second container 20 is discharged outside the system (outside the system 100) via the gas diffusion portion 21.

1. Fuel Cell

The fuel cell 1 at least receives a supply of fuel gas to generate electricity. For example, a fuel gas (for example, hydrogen) is supplied to an anode of the fuel cell 1 and an oxygen-containing gas (for example, air) is supplied to a cathode to cause a power generation reaction. A specific example of the fuel cell 1 is a polymer electrolyte fuel cell (PEFC). The fuel cell 1 may be a stacked cell (fuel cell stack).

The fuel cell 1 may be connected to gas flow paths 1a and 1b for supplying the fuel gas and the oxygen-containing gas. In this case, inside the fuel cell 1, the gas flow paths 1a and 1b may be in contact with the circulation flow path 4 via a seal member (not shown) such as a gasket. The seal member may be made of EPDM rubber, silicone rubber, or elastomer resin. Such a seal member may be a seal member that allows a small amount of gas to pass through.

Further, inside the fuel cell 1, the gas flow paths 1a and 1b and the circulation flow path 4 may be in contact with each other via a separator (not shown). The separator may be made of a composite of resin and carbon. Such a separator may be permeable to a small amount of gas.

A hydrogen permeability coefficient of the seal member or the separator may be $3.0 \times 10^{-13}$ to $1.0 \times 10^{-18}$ mol·m/(m$^2$·sec·Pa).

2. Heat Exchanger As the heat exchanger 2, any heat exchanger generally used in a cooling system of a fuel cell can be adopted. For example, the heat exchanger 2 may be a radiator, an intercooler, an oil cooler, or a combination thereof. In consideration of mounting the heat exchanger 2 on a vehicle, the heat exchanger 2 may at least include a radiator.

3. Coolant

As the coolant 3, any coolant generally used in a cooling system of a fuel cell can be adopted. Examples of the coolant include a coolant containing water as a main component and a coolant containing ethylene glycol as a main component. In the system 100 of the present disclosure, since the cooling system is a substantially sealed system, it is possible to suppress the amount of the coolant that volatilizes out of the system.

4. Circulation Flow Path

The circulation flow path 4 is for circulating the coolant 3 between the fuel cell 1 and the heat exchanger 2. The circulation flow path 4 may include an outward path from the heat exchanger 2 to the fuel cell 1 and a return path from the fuel cell 1 to the heat exchanger 2, and may further include a branched path. The means for circulating the coolant 3 in the circulation flow path 4 is not particularly limited. For example, the coolant 3 can be circulated using a pump 4a.

5. Gas

In order to aim for cost reduction of the fuel cell, simplification of the seal structure for partitioning the gas flow paths 1a and 1b of the fuel cell 1 and the circulation flow path 4 and use of resin for the separator are being considered. The possibility that the gas 5 leaks from the gas flow paths 1a and 1b to the circulation flow path 4 is increased. The system 100 of the present disclosure appropriately discharges the gas 5 leaked to the circulation flow path 4 to the outside of the system. The gas 5 may be a fuel gas such as hydrogen, an oxygen-containing gas such as air, or a combination thereof, as described above.

6. First Container

The first container 10 is connected to the circulation flow path 4 and receives at least a part of the coolant 3 from the circulation flow path 4. The shape, material, and size of the first container 10 are not particularly limited as long as the first container 10 can receive a part of the coolant 3 from the circulation flow path 4. For example, a reservoir tank may be used as the first container 10.

The connection form between the first container 10 and the circulation flow path 4 is not particularly limited. For example, as shown in FIG. 1, the first container 10 and the circulation flow path 4 may be connected via a pipe. The first container 10 may be connected to at least one position of the circulation flow path 4, and may be connected to any position of the circulation flow path 4. For example, as shown in FIG. 1, the first container 10 is connected to the circulation flow path 4 at least two positions in parallel so that the forward path and the return path are provided separately between the first container 10 and the circulation flow path 4. Alternatively, the first container 10 may be interposed in series in the circulation flow path 4 so that the first container 10 receives the entire coolant 3 from the circulation flow path 4.

If the gas 5 leaks from the gas flow paths 1a and 1b of the fuel cell 1 to the circulation flow path 4, the leaked gas 5 reaches the first container 10 together with the coolant 3. The gas 5 that has reached the inside of the first container 10 may stay in a space above the liquid surface of the coolant 3 inside the first container 10, for example.

7. Pressure Regulating Valve

Inside the first container 10, the liquid level of the coolant 3 may change depending on the operating conditions of the fuel cell 1 and sudden temperature changes. For example, the volume of the coolant 3 may expand due to a sudden temperature rise, and the liquid level of the coolant 3 inside the first container 10 may rise. In this case, the pressure inside the first container 10 may also increase. The first container 10 is provided with the pressure regulating valve 11 for regulating the internal pressure.

The pressure regulating valve 11 is opened and closed in accordance with the pressure inside the first container 10. Specifically, when the pressure inside the first container 10 becomes equal to or higher than a threshold, the pressure regulating valve 11 opens and the gas 5 inside the first container 10 is discharged to the outside of the first container 10. The specific value of the threshold is not particularly limited and may be determined appropriately. When the pressure inside the first container 10 is below the threshold, the pressure regulating valve 11 is basically closed, but when the pressure inside the first container 10 becomes a negative pressure, the pressure regulating valve 11 may be opened.

The pressure regulating valve 11 may control the opening and closing of the valve by electrical control, or may control the opening and closing of the valve without electrical control. In particular, when the pressure regulating valve 11 that controls the opening and closing of the valve only by the mechanical mechanism without using the electrical control is used, the system can be further simplified. An example of such a pressure regulating valve 11 is a lid 11b that is pressed against the discharge port of the first container 10 by an elastic member 11a. That is, when the pressure inside the first container 10 becomes equal to or higher than the threshold, the elastic member 11a contracts and the lid 11b opens, and the gas is released from the inside of the first container 10 to the outside. Then, the pressure inside the first container 10 gradually decreases as the gas is released, and when the pressure falls below the threshold, the elastic member 11a extends and the lid 11b is pressed against the discharge port part so that the discharge port is closed again. The specific example of the elastic member 11a is not particularly limited.

8. Second Container

The second container 20 is connected to the first container 10 via the pressure regulating valve 11 and receives the gas 5 released from the inside of the first container 10 via the pressure regulating valve 11. That is, in the system 100, the gas 5 released from the first container 10 is not directly released to the outside of the system, and the gas 5 is temporarily retained in the second container 20 and is gradually discharged to the outside of the system by diffusion via the gas diffusion portion 21. Thus, even if the gas 5 contains a flammable fuel gas, the high-concentration fuel gas is not directly released from the first container 10 to the outside of the system and therefore, the system 100 is excellent in safety. For example, the fuel cell 1 at least receives a supply of hydrogen to generate power, and even if the gas 5 released from the first container 10 contains hydrogen, the hydrogen can be safely discharged to the outside of the system.

The second container 20 may have any shape, material and size in which the second container 20 is capable of temporarily holding the gas 5 released from the first container 10 via the pressure regulating valve 11, and the specific form of the second container 20 is not particularly limited. The second container 20 may have a larger volume than, a smaller volume than, or the same volume as the first container 10. In consideration of mounting the second container 20 on automobiles, the volume of the second container 20 may be 10 cm$^3$ or more, may be 100 cm$^3$ or more, may be a 200 cm$^3$ or more, may be 10000 cm$^3$ or less, may be a 5000 cm$^3$ or less, or may be 1000 cm$^3$ or less, for example.

In the second container 20, it is preferable that parts other than the gas diffusion portion 21 be made of a material having a gas permeability lower than that of the gas diffusion portion 21. The parts of the second container 20 other than the gas diffusion portion 21 can be made of, for example, a resin such as polypropylene.

Figure 2:
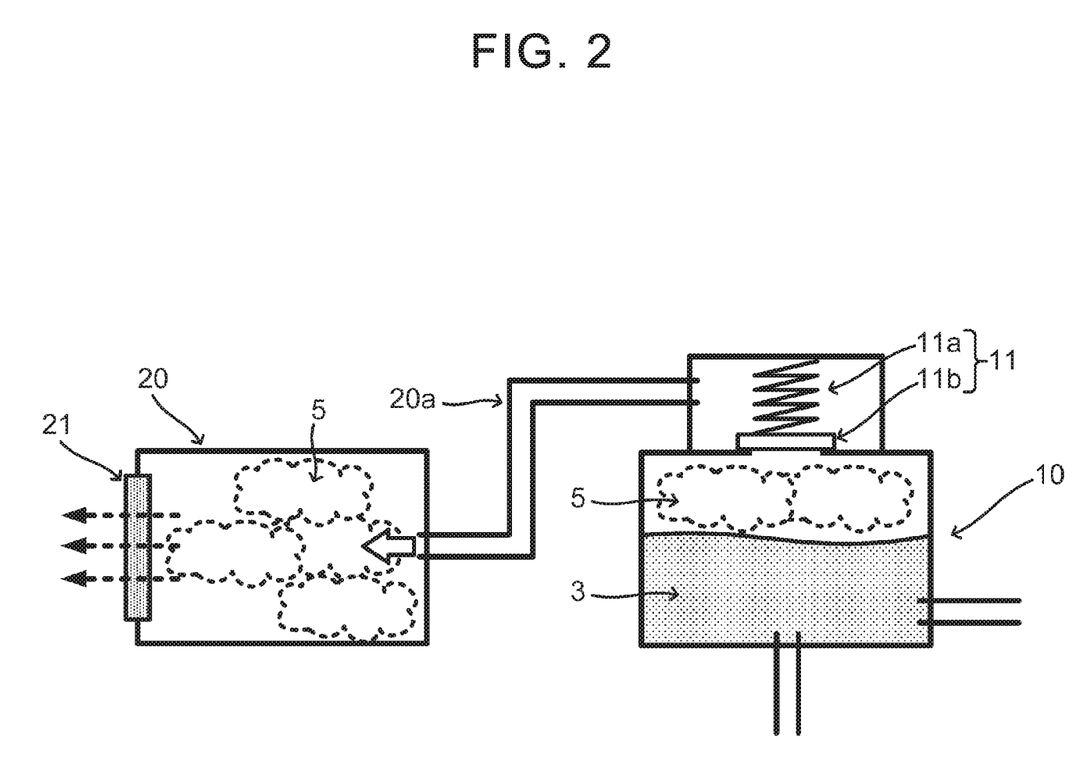
FIG. 2 is a schematic diagram for describing an example of a connection form of a first container and a second container, in which a flow of gas is indicated by a white arrow and dashed arrows.
Figure 3:
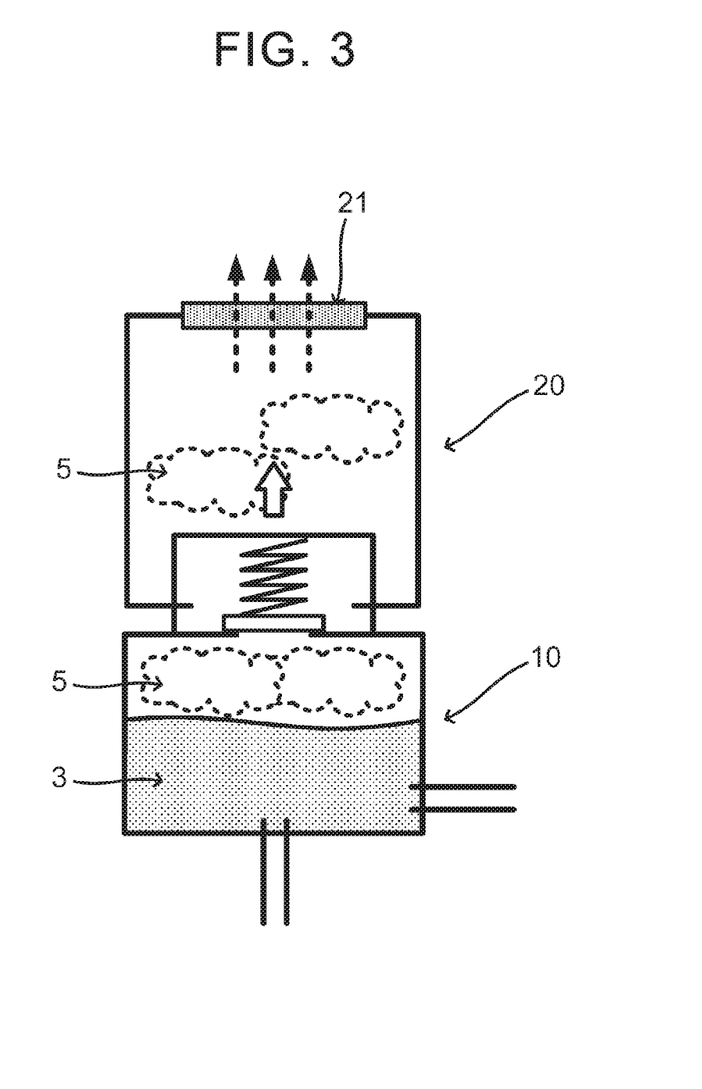
FIG. 3 is a schematic diagram for describing another example of the connection form of the first container and the second container, in which the flow of gas is indicated by a white arrow and dashed arrows.

The connection form between the first container 10 and the second container 20 is not particularly limited. For example, as shown in FIG. 2, the first container 10 and the second container 20 may be connected via a pipe 20a, or as shown in FIG. 3, the first container 10 and the second container 20 may be directly connected so that a part of the pressure regulating valve 11 of the first container 10 is included in the second container 20.

Figure 4:
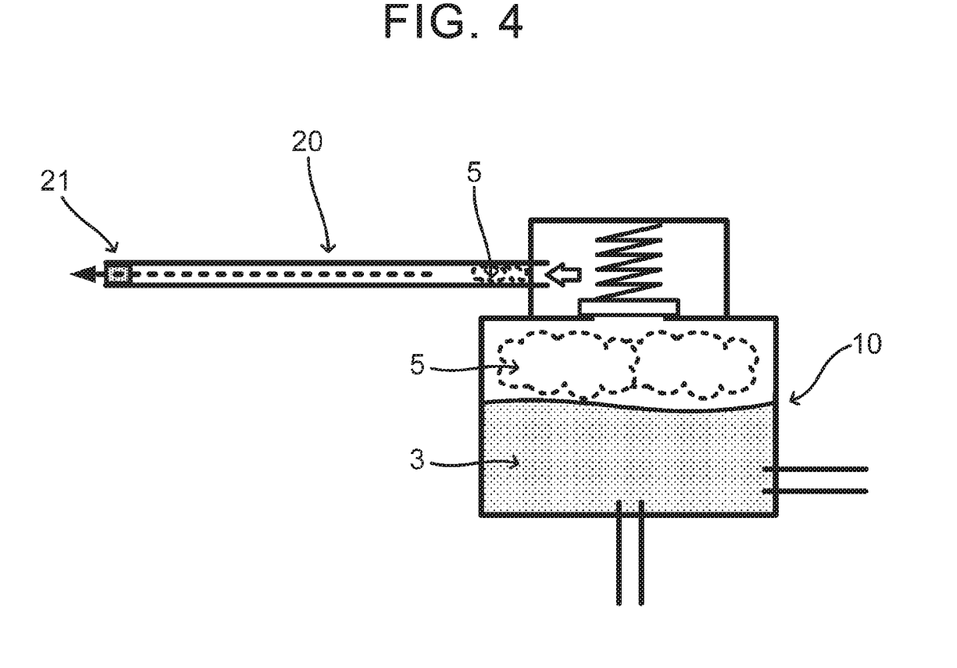
FIG. 4 is a schematic diagram for describing another example of the connection form of the first container and the second container, in which the flow of gas is indicated by a white arrow and a dashed arrow.

Alternatively, as shown in FIG. 4, the second container 20 may be configured by a pipe having a predetermined length. That is, one end of the pipe may be connected to a part of the pressure regulating valve 11 of the first container 10 and the other end of the pipe may be connected to the gas diffusion portion 21. When the second container 20 is a pipe, the length of the pipe may be long enough to receive and diffuse the gas 5. For example, the length may be 1 m or more.

9. Gas Diffusion Portion

The "gas diffusion portion" referred to in the present application, by its structure and shape, can suppress the movement of the gas 5 due to convection between the inside of the second container 20 and the outside of the system, increase the diffusion resistance of the gas 5, allow the gas 5 to diffuse and permeate (while reducing the gas diffusion rate), and release the gas 5 to the outside of the system. For example, the diffusion rate of the gas 5 released from the second container 20 to the outside of the system can be reduced by providing an arbitrary member or shape with a narrow flow path diameter between the inside of the second container 20 and the outside of the system. Specifically, a gas diffusion filter, a fine pipeline, or the like can be used. The flow path diameter may be, for example, 5.0 mm or less, 3.0 mm or less, 1.0 mm or less, or 0.62 mm or less, or may be 0.30 mm or less, as described below.

At least a part of the second container 20 is provided with such a gas diffusion portion 21. The gas 5 released from the inside of the first container 10 to the inside of the second container 20 via the pressure regulating valve 11 is discharged to the outside of the system via the gas diffusion portion 21. Hereinafter, specific forms of the gas diffusion portion 21 will be exemplified. However, the disclosure is not limited to these.

Figure 5:
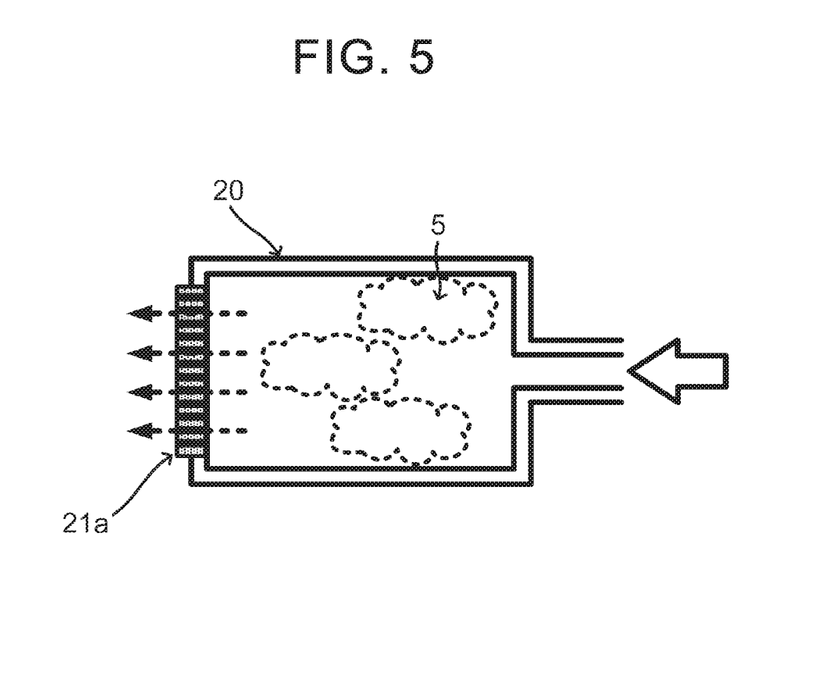
FIG. 5 is a schematic diagram for describing an example of a configuration of a gas diffusion portion, in which the flow of gas is indicated by a white arrow and dashed arrows.

As shown in FIG. 5, the gas diffusion portion 21a that has a plurality of through holes extended from the inside of the second container 20 to the outside may be adopted. That is, the gas diffusion portion 21a may be shaped like a filter. In this case, the gas diffusion portion 21a may have a plurality of through holes extending from the inside of the second container 20 to the outside and having a hole diameter of 0.62 mm or less. In the through holes having a pore diameter of 0.62 mm or less, it is considered that the combustion of hydrogen can be suppressed (extinguished) (Journal of the Combustion Society of Japan, Vol. 51, No. 158 (2009) 325-333, etc.). The diameter of the through hole may be 0.30 mm or less. The gas diffusion portion 21a having such through holes can be formed of, for example, a metal mesh or a porous metal sintered body. Alternatively, a metal plate with a pinhole may be used as the gas diffusion portion 21a. Since the gas diffusion portion 21a is made of metal, heat energy is easily absorbed, that is, the combustion of hydrogen is more easily suppressed (extinguished). The gas diffusion portion 21a may be provided in at least a part of the second container 20. The gas diffusion portion 21a may be provided near the part of the second container 20 that is connected to the first container 10, or may be provided on a part on the opposite side of the second container 20 from the part that is connected to the first container 10 (part farthest from the part connected to the first container 10).

Figure 6:
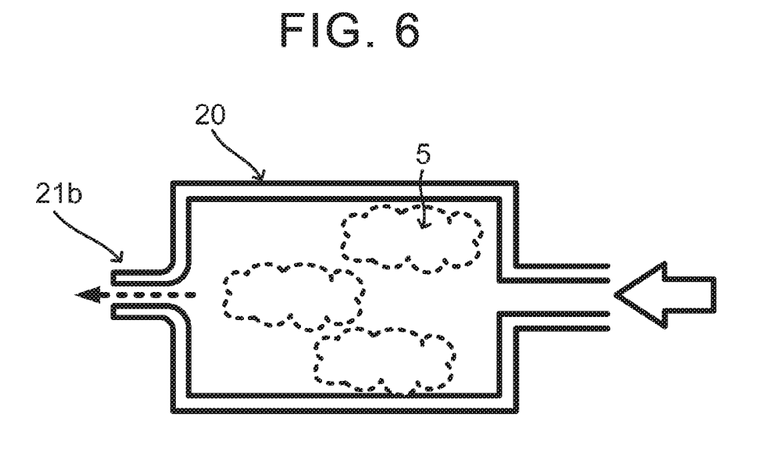
FIG. 6 is a schematic diagram for describing another example of a configuration of the gas diffusion portion, in which the flow of gas is indicated by a white arrow and a dashed arrow.

As shown in FIG. 6, the flow path sectional area of the gas 5 may be narrowed in the gas diffusion portion 21. That is, the gas diffusion portion 21 may be a narrowed portion 21b provided in a part of the second container 20. The narrowed portion 21b may be provided near the part of the second container 20 connected to the first container 10, or may be provided on the part on the opposite side of second container 20 from the part connected to the first container 10 (the part farthest from the part connected to the first container 10). The flow path diameter of the narrowed portion 21b is as described above. As in the case of the gas diffusion portion 21a described above, the quenching performance may be improved by setting the flow path diameter of the narrowed portion 21b to 0.62 mm or less or 0.30 mm or less.

Figure 7:
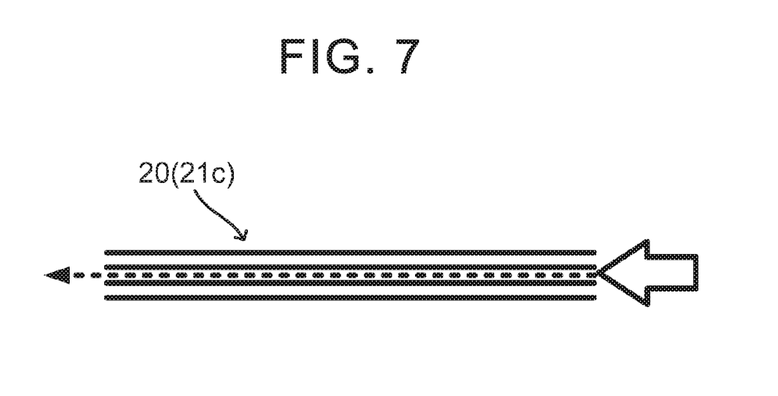
FIG. 7 is a schematic diagram for describing another example of a configuration of the gas diffusion portion, in which the flow of gas is indicated by a white arrow and a dashed arrow.

As shown in FIG. 7, the gas diffusion portion 21 may be an elongated pipe 21c. As described above, since the second container 20 can be a pipe, the second container 20 itself including the elongated pipe 21c may function as the gas diffusion portion 21. The length of the pipe 21c is as described above. The flow path diameter of the pipe 21c is also as described above. As in the case of the gas diffusion portion 21a described above, the quenching performance may be improved by setting the flow path diameter of the pipe 21c to 0.62 mm or less or 0.30 mm or less.

Figure 8:
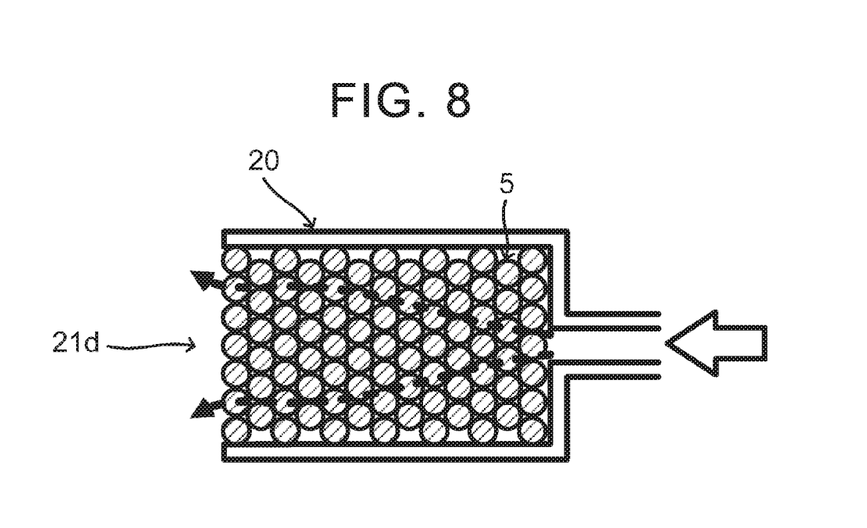
FIG. 8 is a schematic diagram for describing another example of a configuration of the gas diffusion portion, in which the flow of gas is indicated by a white arrow and dashed arrows.

As shown in FIG. 8, the gas diffusion portion 21 may include a filler aggregate 21d. That is, the inside of the second container 20 may be filled with a filler, and this may function as the gas diffusion portion 21. Examples of the filler include metal beads and ceramic beads. As shown in FIG. 8, the filler aggregate 21d has narrow gaps and is capable of diffusing and permeating the gas 5. In this case, the diameter of the flow path formed by the narrow gaps may be 0.62 mm or less or 0.30 mm or less to improve the flame-extinguishing performance.

A molecular sieve membrane such as a zeolite membrane may be used as the gas diffusion portion 21. In this case, a component of the gas 5 having a small molecular diameter (for example, hydrogen) can be preferentially permeated in the gas diffusion portion 21.

Alternatively, two or more of the various gas diffusion portions described above may be combined, or a configuration other than these may be adopted.

10. Operations and Effects

In the fuel cell, the gas in the gas flow path may leak from the gasket (seal member) or the separator into the circulation flow path of the cooling system. For example, the fuel gas may leak from the gas flow path to the circulation flow path, and the fuel gas concentration of the coolant may increase. On the other hand, there is a case in which the volume of the coolant expands due to a sudden temperature rise, etc., the coolant level of the first container connected to the circulation flow path rises, and the gas inside the first container is pushed out via the pressure regulating valve. If the coolant contains a high-concentration fuel gas and the first container also contains a high-concentration fuel gas, the high-concentration fuel gas may be released into the outside air at once.

In the system 100 of the present disclosure, the second container 20 is connected to the first container 10, and when the internal pressure of the cooling system rises and the pressure regulating valve 11 opens, the released gas 5 released from the first container 10 is temporarily held in the second container 20. That is, the gas 5 is not released outside the system at once. The gas 5 inside the second container 20 is gradually exchanged with the gas outside the system by diffusion via the gas diffusion portion 21, whereby the concentration of the gas 5 inside the second container 20 is gradually decreased. That is, even if the fuel gas is contained in the gas 5 released from the first container 10, the fuel gas having a low concentration can be discharged to the outside of the system by using diffusion via the inside of the second container 20 and the gas diffusion portion 21.

Further, in the system 100 of the present disclosure, by releasing the gas 5 from the first container 10 to the second container 20, the gas concentration in the circulation flow path 4 decreases and the pressure also decreases. Thereafter, since it takes time for the internal pressure in the first container 10 to rise again, it is considered that the gas 5 is not continuously released from the first container 10.

Further, in the system 100 of the present disclosure, the cooling system can be made independent of other control systems, and as described above, it is not necessary to provide a complicated control device for opening and closing the pressure regulating valve 11. That is, it is possible to simplify the system configuration as compared with the related art.

In the related art of ventilating the inside of the cooling system, a loss of the coolant due to volatilization is inevitable. In contrast, in the system 100 of the present disclosure, the cooling system of the fuel cell 1 can be a substantially sealed system, and the problem of volatilization of the coolant can be suppressed.

Further, in the system 100 of the present disclosure, it is considered that the partial pressure of the gas in the circulation flow path 4 is maintained by setting the cooling system as the substantially sealed system. In this case, it is considered that the difference between the gas partial pressure in the gas flow paths 1a and 1b of the fuel cell 1 and the gas partial pressure in the circulation flow path 4 becomes small, and the leakage of the gas from the gas flow paths 1a and 1b to the circulation flow path 4 of the fuel cell 1 can be suppressed.

What is claimed is:

1. A cooling system of a fuel cell, the cooling system comprising:
   a fuel cell;
   a heat exchanger;
   a circulation flow path configured to circulate a coolant between the fuel cell and the heat exchanger;
   a first container that is connected to the circulation flow path and that is configured to receive at least a part of the coolant from the circulation flow path;
   a pressure regulating valve that is provided in the first container and that is configured to release a gas inside the first container to outside the first container when a pressure inside the first container is equal to or higher than a threshold;
   a second container that is connected to the first container via the pressure regulating valve and that is configured to receive the gas released from inside the first container via the pressure regulating valve; and
   a gas diffusion portion provided in the second container, wherein
   the gas diffusion portion is configured such that the gas released inside of the second container via the pressure regulating valve is discharged outside the cooling system via the gas diffusion portion when the pressure inside the first container is equal to or higher than the threshold, and the gas diffusion portion is configured to suppress movement of the gas due to convection between the inside of the second container and the outside of the cooling system.

2. The cooling system according to claim 1, wherein
   the fuel cell is configured to receive at least a supply of hydrogen and generate power, and
   the gas released from the first container contains hydrogen.

3. The cooling system according to claim 1, wherein the gas diffusion portion has a plurality of through holes that extend from inside to outside of the second container.

4. The cooling system according to claim 3, wherein a hole diameter of the through holes of the gas diffusion portion is 0.62 mm or less.

* * * * *